(12) United States Patent
Wang

(10) Patent No.: US 11,736,137 B2
(45) Date of Patent: Aug. 22, 2023

(54) MOBILE PHONE FILM ATTACHING DEVICE EQUIPPED WITH REINFORCED GLASS FILM

(71) Applicant: Shouyun Wang, Dongguan (CN)

(72) Inventor: Shouyun Wang, Dongguan (CN)

( * ) Notice: Subject to any disclaimer, the term of this patent is extended or adjusted under 35 U.S.C. 154(b) by 0 days.

(21) Appl. No.: 17/394,426

(22) Filed: Aug. 5, 2021

(65) Prior Publication Data

US 2023/0043785 A1 Feb. 9, 2023

(51) Int. Cl.
*H04B 1/3888* (2015.01)
*H04M 1/02* (2006.01)

(52) U.S. Cl.
CPC ........ *H04B 1/3888* (2013.01); *H04M 1/0266* (2013.01)

(58) Field of Classification Search
CPC ............................ H04B 1/3888; H04M 1/0266
See application file for complete search history.

(56) References Cited

U.S. PATENT DOCUMENTS

| | | | | |
|---|---|---|---|---|
| 8,369,072 B1* | 2/2013 | Alonzo | ................. | G06F 1/1637 361/679.01 |
| 8,675,353 B1* | 3/2014 | Alonzo | ................. | G06F 1/1628 361/679.01 |
| 2014/0047708 A1* | 2/2014 | Chae | ..................... | H04B 1/3888 29/700 |
| 2014/0130971 A1* | 5/2014 | Wu | ...................... | H04B 1/3888 156/249 |
| 2015/0277502 A1* | 10/2015 | Witham | .............. | H04B 1/3888 269/287 |
| 2016/0294428 A1* | 10/2016 | Li | ........................ | H04B 1/3888 |
| 2017/0297268 A1* | 10/2017 | Witham | .............. | H04B 1/3888 |
| 2018/0037016 A1* | 2/2018 | Kim | ........................ | B29C 63/02 |
| 2018/0145715 A1* | 5/2018 | Abadi | .................. | H04B 1/3888 |
| 2019/0047815 A1* | 2/2019 | Kim | ........................... | C09J 7/00 |
| 2019/0149183 A1* | 5/2019 | Techter | ............... | H04M 1/0202 455/575.8 |
| 2020/0094467 A1* | 3/2020 | Cho | .................... | B29C 63/0004 |
| 2020/0204664 A1* | 6/2020 | Bulkley | ............... | H04B 1/3888 |
| 2021/0002054 A1* | 1/2021 | Oh | .......................... | B32B 27/08 |
| 2021/0176351 A1* | 6/2021 | Bulkley | ................ | G06F 1/1656 |
| 2021/0252770 A1* | 8/2021 | Lee | ........................ | G06F 1/1626 |
| 2022/0040909 A1* | 2/2022 | Webster | ............. | B29C 63/0004 |

* cited by examiner

*Primary Examiner* — Ernest G Tacsik

(57) ABSTRACT

A mobile phone film attaching device equipped with a reinforced glass film, including: a film attaching device main body, a connector and a reinforced glass film, a holding space, and a recess area. The holding space has a bottom surface to touch the surface of the mobile phone screen; among the relative two ends of the reinforced glass film, one end is protruded from or aligned to the bottom surface, the other end is not protruded from the bottom surface, so that, when the film attaching device main body covers the mobile phone, among the relative two ends of the reinforced glass film, the end protruding from or aligned to the bottom surface touches the mobile phone screen, a gap is maintained between the end not protruding from the bottom surface and the mobile phone screen.

11 Claims, 7 Drawing Sheets

MOBILE PHONE FILM ATTACHING DEVICE EQUIPPED WITH REINFORCED GLASS FILM

BACKGROUND OF INVENTION

1. Field of the Invention

The present invention relates generally to the technical field of mobile phone screen protectors, and more particularly to a mobile phone screen protector attaching device which is equipped with a reinforced glass film.

2. Description of Related Art

Reinforced glass films are self-adhesive. With the self-adhesion property, when part of the reinforced glass film is adhered to the mobile phone screen, even if no external force is applied, the adhesion area will gradually extend outward under the influence of the tension and gravity of the material itself, till the whole area is adhered. Due to this property of the reinforced glass film, when users adhere the film, it is very likely that there will be bubbles remained in the adhesion area. Specifically, as shown in FIG. 1 and FIG. 2, the first reinforced glass film attaching method is that the operator uses two hands to respectively hold the two sides 103, 104 of the reinforced glass film 100, confirms the position alignment with naked eye, and places the reinforced glass film 100 horizontally on the mobile phone screen 200. To ensure accurate alignment, the operator must firstly confirm that the edges of the reinforced glass film are aligned. As a result, the pressing force applied is normally on the ends of the reinforced glass film 200. Under the adhesion force between the reinforced glass film itself and the mobile phone screen, the film is automatically adhered to the mobile phone screen. The adhesion area between the reinforced glass film 100 and the mobile phone screen 200 extends from the end portion to the center portion, and the air in the center area can not be discharged smoothly, thus causing bubbles 300. When bubbles occur, the operator can only use fingers or other tools to squeeze the bubbles from the center of the reinforced glass film to the outside, so as to remove the bubbles 300. In this film attaching method, because the attaching area between the reinforced glass film and the mobile phone screen is quite large, and the attaching direction can not be controlled, more bubbles will occur, and it is very difficult to remove all the bubbles. Meanwhile, due to insufficient adhesion between the edge of the reinforced glass film and the edge of the mobile phone screen, white edges may occur to affect the quality of the adhesion and the overall appearance of the mobile phone. Therefore, if it is judged that the film attachment is not qualified, the reinforced glass film must be pulled out and redo the film adhesion.

In the second film attaching method, as shown in FIG. 3, when attaching the reinforced glass film 100, firstly one end 101 of the reinforced glass film 100 shall be aligned to one end 201 of the mobile phone screen 200, and after the position is confirmed, use a finger or a tool to press and adhere one end of the reinforced glass film 100 to one end of the mobile phone screen 200. At this time, the reinforced glass film 100 is in a tilted position in relation to the mobile phone screen 200. Then, after releasing the reinforced glass film 100, the reinforced glass film 100 is adhered to the mobile phone screen 200. Under the gravity and self adhesion force of the reinforced glass film 100, the reinforced glass film 100 is attached from the already adhered end 101 gradually toward the other end. During this adhesion process, air will be discharged automatically toward the unattached area, till the whole reinforced glass film 100 is adhered to the mobile phone screen. This method is better than the aforethe first method as less bubbles may occur. And even if bubbles occur, they can be removed easily afterwards. However, the difficult thing is that one end 101 of the reinforced glass film 100 must be firstly aligned to one end 201 of the mobile phone screen 200. Without using an assistant tool, this is very difficult to operate manually with the naked eye only.

From the above two methods, it is clear that two aspects must be ensured to complete perfect attachment of the reinforced glass film all at once: firstly, one end of the reinforced glass film must be firstly aligned to one end of the mobile phone screen; secondly, during attachment of the reinforced glass film, it must be in a tilted position and adhered to the mobile phone screen automatically through the gravity and self-adhesion property of the reinforced glass film itself while discharging the air to the outside. Thus, the film attachment can be completed all at once.

In general, the auxiliary device for attaching films (or film attaching device) available on the market can only assure the accuracy of alignment between the reinforced glass film and the mobile phone screen. However, during the attachment of the film, the reinforced glass film is still parallel to the mobile phone screen. This will result in the same problems that occur in the first film attaching method. Bubbles will occur easily and can not be removed perfectly. The quality of film adhesion can not be guaranteed. Therefore, it can not meet the requirement of operators in usage.

Furthermore, for the sellers of reinforced glass film, in order to promote sales, they will usually give away a film attaching device when the consumers buy their reinforced glass film. However, such bundle selling actually brings no convenience to the consumers. The reason is as follows: firstly, consumers still need to align and place the reinforced glass film in the film attaching device before attaching the film. During the whole process, the consumer needs to complete two alignments. The operation is more complicated. As long as the alignment is not accurate, the whole operation needs to be repeated. In particular, during the film attachment process, after the protective film is torn off from the reinforced glass film, if it is discovered that the alignment is not accurate or there are bubbles beneath the reinforced glass film, the reinforced glass film must be pulled open and redo the alignment and adhesion. In case the adhesive side of the reinforced glass film is contaminated with dust or foreign objects, bubbles will occur after the reinforced glass film is adhered. This will on the contrary cause bad experience to the consumers.

In view of the above problems, the inventor proposed the following technical solution.

SUMMARY OF THE INVENTION

The purpose of the present invention is to overcome the shortcomings of the prior art and provide a mobile phone film attaching device equipped with reinforced glass film.

In order to solve the above technical problems, the present invention adopts the following technical solutions:

A mobile phone film attaching device equipped with a reinforced glass film, including: a film attaching device main body, a connector and a reinforced glass film, a holding space formed in a bottom end surface of the film attaching device main body for matching the shape of a mobile phone and covering the mobile phone, and a recessed area formed in the accommodation space; wherein the holding space has a bottom surface for abutting against a bottom surface of the mobile phone; the reinforced glass film is arranged in the recess area through a connector, and one end surface of the reinforced glass film protrudes or is flush with the bottom surface, and another end surface does not protrude from the bottom surface; the film attaching device main body is covered on the mobile phone, the end surface of the reinforced glass film that is protruded from or flushed with the bottom surface is in contact with the mobile phone screen, and the other end surface of the reinforced glass film that does not protrude from the bottom surface has a gap disposed between the other end surface and the mobile phone screen.

More particularly, wherein the depth of the recess area has height differences, the depth on one side is larger than the depth on the other side, through the height difference, the reinforced glass film is in a tilted position in relation to the bottom surface.

More particularly, wherein a raised portion is configured between the recess area and the reinforced glass film, through the raised portion, the reinforced glass film is in a tilted position in relation to the bottom surface.

More particularly, wherein the loading bottom surface of the recess area to load the reinforced glass film is tilted, i.e., the depth of the recess area varies gradually from one end of the film attaching device main body to the other end, through the loading bottom surface, the reinforced glass film is at a tilted position in relation to the bottom surface.

More particularly, wherein the holding space is enclosed by continuous or discontinuous edgings.

More particularly, wherein the connector is connected to the upper surface of the reinforced glass film, the lower surface of the reinforced glass film is attached with a release film.

More particularly, wherein the release film has an extended portion extending out of the reinforced glass film area.

More particularly, wherein the connector is an adhesive layer or an adhesive piece, the connector is fixed on the bottom surface of the film attaching device main body, and the reinforced glass film is suspended and adhered to the recess area through the connector.

More particularly, wherein the connector is a tape, sticker or film with one single adhesive surface, the connector is configured on the upper surface of the film attaching device main body, and the film attaching device main body is provided with an up-to-down through window or notch, the connector is connected to the upper surface of the reinforced glass film through the window or notch.

More particularly, wherein a positioning mechanism is formed on the upper surface of the film attaching device main body to match the connector.

More particularly, wherein the connector includes a main body portion and an extended portion integrally connected to the upper end of the main body portion with its width smaller than that of the main body portion, the width of the extended portion is smaller than that of the window; the connector also includes a hand-holding portion that is protruding out of the end of the film attaching device main body, and that has no adhesive side for holding by hand.

After adopting the above technical solution, the present invention can offer the following benefits and advantages comparing to the prior art:

After covering the main body of the film attaching device on the mobile phone, no manual operation is needed to adjust the position of the reinforced glass film in relation to the mobile phone screen to achieve perfect alignment. The alignment can be completed all at once with misalignment. Thus, the film attaching steps are simplified, and the difficulty is reduced. Also, of the relative two ends of the reinforced glass film, the end protruding from or aligned to the bottom surface touches the mobile phone screen, a gap is maintained between the end without protruding from the bottom surface and the mobile phone screen. Thus, when attaching the film, one end of the reinforced glass film firstly touches one end of the mobile phone screen, then the adhesion and air discharge is completed automatically through the gravity and self-adhesion property of the reinforced glass film itself. The film can be attached all at once.

In addition, the present invention provides a mobile phone film attaching device equipped with a reinforced glass film. That is to say, the reinforced glass film is combined with the main body of the film attaching device. Thus, when consumers buy the reinforced glass film, no alignment is required. They just need to tear off the release film from the reinforced glass film, cover the device on the corresponding mobile phone and the film attachment can be completed automatically.

The present invention features easy operation. Everybody can use it to achieve high-quality film adhesion. Therefore, the invention has very good market competitiveness.

DETAILED DESCRIPTION OF THE INVENTION

The present invention is a mobile phone film attaching device, which is a device specially used to attach a reinforced protective film to the surface of the mobile phone screen. Following are further descriptions with reference to embodiment figures.

Figure 1:
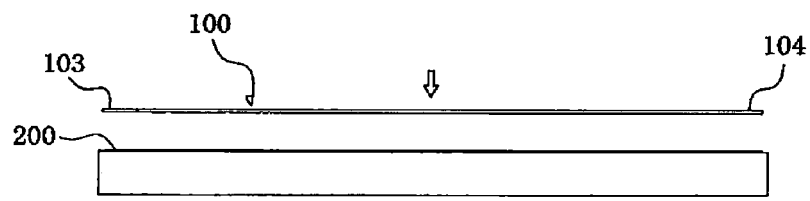
FIG. 1 is a schematic view of the first film attaching method in the prior art.
Figure 2:
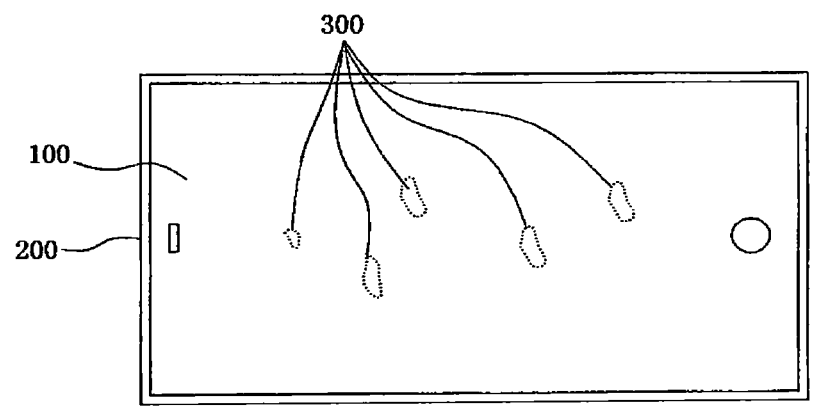
FIG. 2 is a combined view of the mobile phone and the reinforced glass film using the first film attaching method in the prior art.
Figure 3:
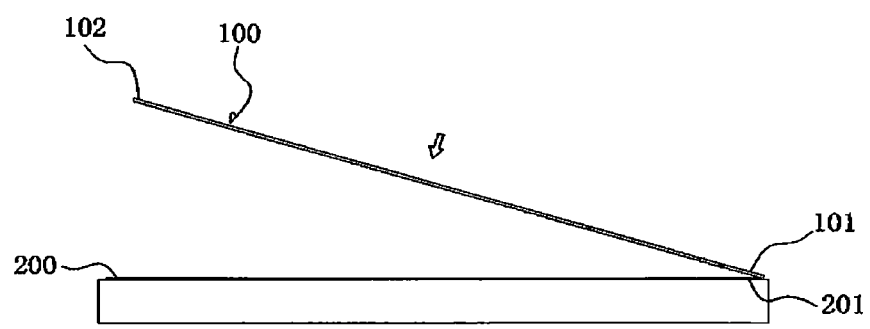
FIG. 3 is a schematic view of the second film attaching method in the prior art.
Figure 4:
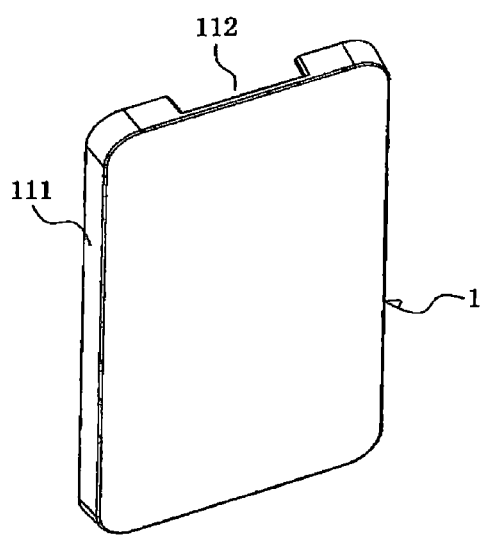
FIG. 4 is a perspective view of Embodiment 1 of the invention.
Figure 5:
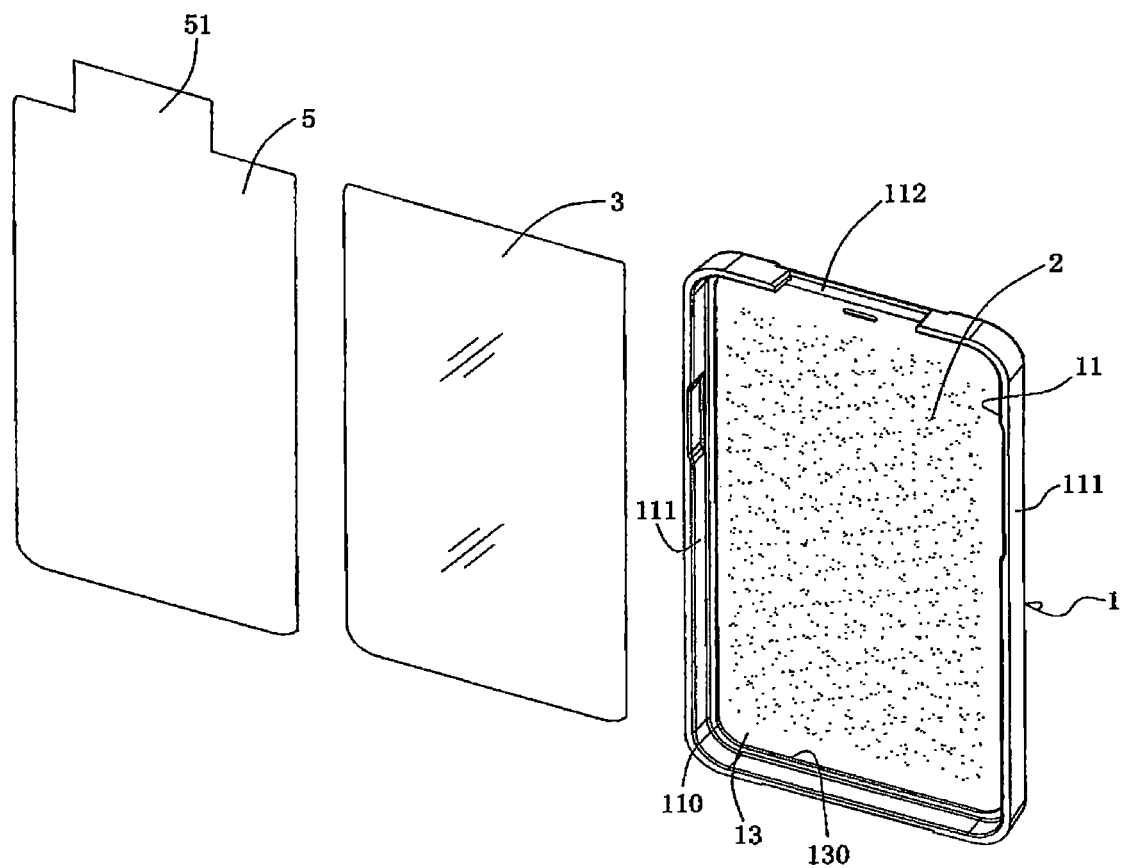
FIG. 5 is an exploded perspective view of Embodiment 1 of the invention from another viewing angle.
Figure 6:
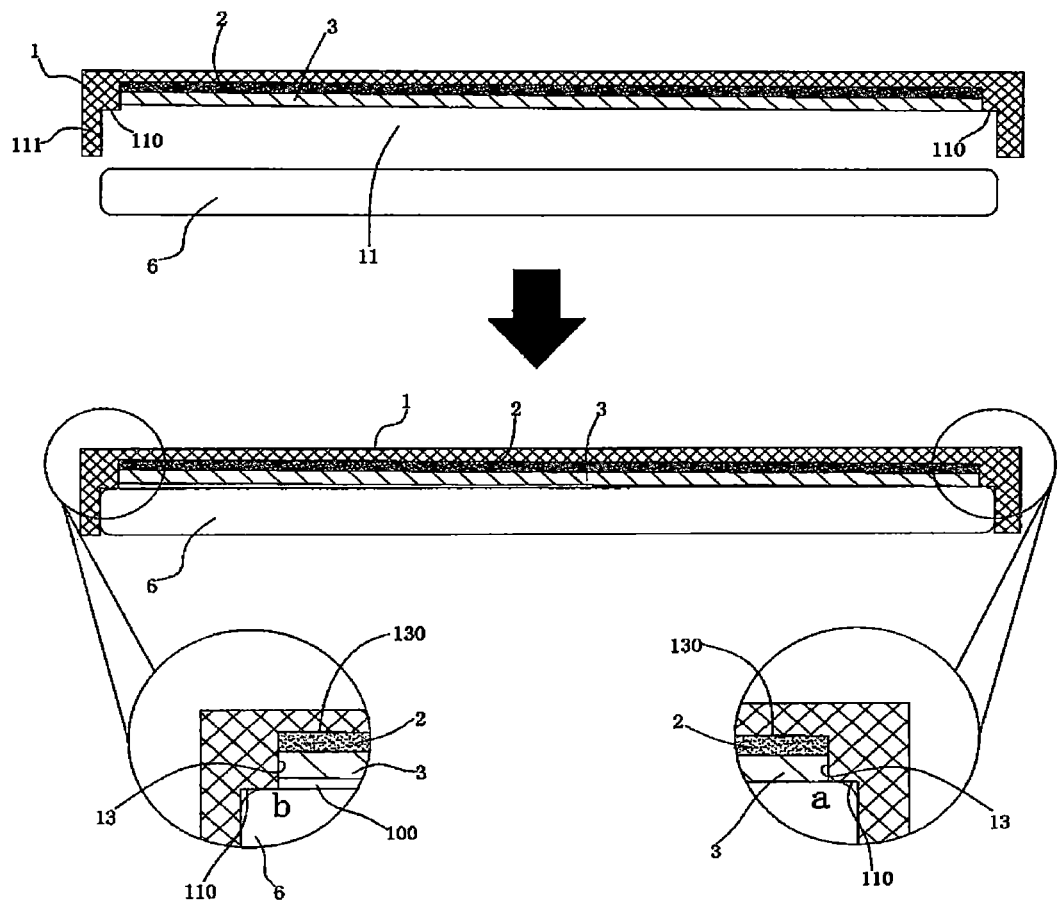
FIG. 6 is a schematic view of Embodiment 1 of the invention during the film attaching process.

Depicted in FIG. 4 to FIG. 6 is Embodiment 1 of a mobile phone film attaching device equipped with a reinforced glass film, which includes: a film attaching device main body 1, a connector 2 and a reinforced glass film 3.

The film attaching device main body 1 can be made and formed with plastic, metal or ceramic materials.

The bottom surface of the film attaching device main body 1 is formed with a holding space 11 to cover the mobile phone. The enclosing space of the holding space 11 matches the corresponding model of the mobile phone. The holding space 11 has a bottom surface 110 to touch the surface of the mobile phone. The bottom surface 110 can be formed by the protruding bar configured inside the holding space 11. That is to say, the area of the holding space 11 limits the edges the mobile phone, and the bottom surface 110 limits the surface on one side of the mobile phone screen.

The holding space 11 is usually enclosed by edgings. Specifically, the holding space 11 can be enclosed by continuous or discontinuous edgings 111. In the present embodiment, the holding space 11 is enclosed by continuous edgings 111, i.e, by the bar-shaped edgings 111 distributed on the periphery of the bottom surface of the film attaching device main body 1.

Inside the holding space 11, a recess area 13 is formed. The recess area 13 is used to place the reinforced glass film 3. The reinforced glass film 3 is configured inside the recess area 13 through a connector 2. In the present embodiment, the connector 2 is an adhesive layer (see the shaded area in FIG. 5). The connector 2 is coated on the bottom surface of the film attaching device main body 1. The reinforced glass film 3 is suspended and adhered inside the recess area 13 through the connector 2. The connector 2 shall not be made too sticky, otherwise it will be difficult to separate the reinforced glass film 3 from the connector 2. It is not necessary to adhere the full area of the reinforced glass film 3 to the connector 2. A certain adhesive area will be enough to fix the reinforced glass film 3 on the bottom surface of the film attaching device main body 1 through the connector 2. In actual production, the shape of the recess area 13 can match the shape of the reinforced glass film 3, so that the recess area 13 can limit the reinforced glass film 3. Of course, the shaped recess area 13 can be larger than the reinforced glass film 3. When the reinforced glass film 3 is adhered through the connector 2, the position shall be confirmed. When the two are attached to each other, the position is fixed.

In addition, the connector 2 can also be an adhesive piece, such as a double-sided adhesive tape, or a sticky film etc.

When the reinforced glass film 3 is fixed inside the holding space 11 through the connector 2, as the holding space 11 matches the contour of the mobile phone, when the film attaching device main body 1 covers the mobile phone, the reinforced glass film 3 is accurately aligned to the mobile phone screen, and the user does not need to make the alignment twice.

Referring to FIG. 6, the reinforced glass film 3 is configured inside the recess area 13 through the connector 2, and of the relative two ends of the reinforced glass film 3, end a is protruded from or aligned to the bottom surface 110, the other end b is not protruded from the bottom surface 110, such that, when the film attaching device main body 1 covers the mobile phone 6, of the relative two ends a and b of the reinforced glass film 3, the end a that is protruded from or aligned to the bottom surface 110 touches the mobile phone screen, and there is a gap 100 between the other end b that is not protruded from the bottom surface 110 and the mobile phone screen.

In order to realize the effect that, of the two relative ends of the reinforced glass film 3, end a is protruded from or aligned to the bottom surface 110, end b is not protruded from the bottom surface 110, the present embodiment adopts the following method: as shown in FIG. 6, the depth of the recess area 13 has height differences, the depth on one side is larger than the depth on the other side, through the height difference, the reinforced glass film 3 is at a tilted position in relation to the bottom surface 110. To be more specific, the loading bottom surface 130 inside the recess area 13 to load the reinforced glass film 3 is tilted, i.e., the depth of the recess area 13 varies gradually from end a to end b, and the depth is gradually increased. As the thickness of the coated adhesive layer as the connector 2 and the thickness of the reinforced glass film 3 basically will not change, and as the loading bottom surface 130 is a tilted surface, through the loading bottom surface, the reinforced glass film 3 is at a tilted position in relation to the bottom surface 110, and a gap 100 is formed at the end b.

The reinforced glass film 3 delivered from the factory will usually have its adhesive side adhered with a release film 5. When using, the release film 5 shall be peeled off before attaching the glass film. The release film 5 has an extended portion 51 extended out of the reinforced glass film 3. The extended portion 51 can be used to facilitate removal of the release film 5. Through the extended portion 51, the reinforced glass film 3 can be easily separated. The extended portion 51 also has a positioning function. In addition, the edging 111 to form the holding space 11 is provided with a notch 112 at the position corresponding to the extended portion 51.

Referring to FIG. 6, when attaching the film, use the present embodiment of a mobile phone film attaching device equipped with a reinforced glass film to cover the mobile phone 6 of a matching model. Before covering, the release film 5 on the adhesive side of the reinforced glass film 3 shall be removed. The holding space 11 of the film attaching device main body 1 is used to align the position of the mobile phone 6. When the film attaching device main body 1 fully covers the mobile phone 6, the reinforced glass film 3 is positioned above the screen of the mobile phone 6. At this time, of the two relative ends a and b of the reinforced glass film 3, end a touches the edge of the screen of the mobile phone 6, end b of the reinforced glass film 3 does not touch the screen of the mobile phone 6, and a gap 100 is maintained. Under this state, the reinforced glass film 3 is at a tilted position in relation to the mobile phone screen. End a of the reinforced glass film 3 directly touches the edge of the screen of the mobile phone 6. Through the self-adhesion property of the reinforced glass film 3, the reinforced glass film 3 is gradually and automatically adhered from end a to end b, i.e., the adhesion area between the reinforced glass film 3 and the screen of the mobile phone 6 gradually increase from end a to end b of the reinforced glass film 3. As end b of the reinforced glass film b is not protruded from the bottom surface 110, the reinforced glass film 3 can not be completely adhered to the screen of the mobile phone 6. There will still be a gap 100 between the two, and further adhesion is not possible. In the end, remove the film attaching device main body 1, so as to separate the reinforced glass film 3 from the connector 2. When the reinforced glass film 3 is not connected to the connector 2, under the tension and self-adhesion of the material itself, the reinforced glass film 3 is fully adhered to the screen of the mobile phone 6, and the whole film attaching operation is completed.

Embodiment 2

Figure 7:
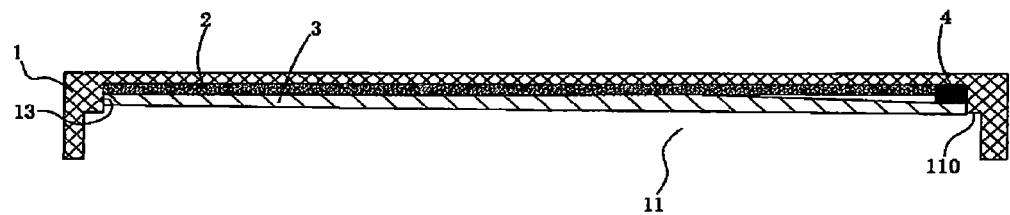
FIG. 7 is a sectional view of Embodiment 2 of the invention.

Embodiment 2 has a structure different from Embodiment 1. The difference is that: in Embodiment 1, a height difference of depth is formed through the tilted surface of the loading bottom surface 130 in the recess area 13. The present embodiment adopts another method. See FIG. 7, in this embodiment, a raised portion 4 is configured between the recess area 13 and the reinforced glass film 3. Through this raised portion 4, the reinforced glass film 3 is tilted in relation to the bottom surface 110. The raised portion 4 raises the height of the reinforced glass film 3 on one side, so that the reinforced glass film 3 is at a tilted position in relation to the bottom surface 110.

Of course, the raised portion 4 can also be realized through other methods. For example, the raised portion 4 can be directly formed on the bottom surface of the film attaching device main body 1, or, can be a tape or soft glue adhered on the bottom side of the film attaching device main body 1.

In the above embodiment, the connector 2 is configured on the bottom surface of the film attaching device main body 1 through coating or adhesion. But it has a drawback. To make sure that the film attaching device main body 1 can be smoothly removed without pulling off the reinforced glass film 3 together, the adhesion between the connector 2 and the reinforced glass film 3 shall be weak, much weaker than the adhesion between the reinforced glass film 3 and the mobile phone screen. The poses a high requirement for the adhesion of the glue. Therefore, the present invention provides another method, i.e., to configure the connector 2 on the top surface of the film attaching device main body 1.

Embodiment 3

Figure 8:
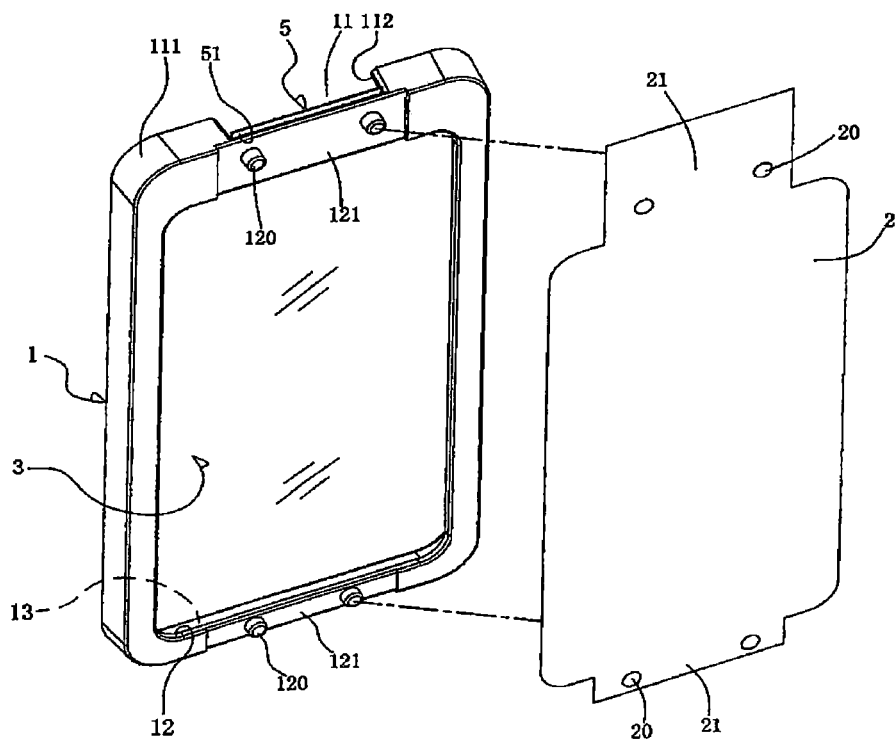
FIG. 8 is a perspective view of Embodiment 3 of the invention.

Referring to FIG. 8, in this embodiment, the holding space 11 is enclosed by a continuous frame 111, with a notch 112 maintained. The notch 112 is used to extend the extended portion 51 of the release film 5, to facilitate removal of the release film 5.

The connector 2 is a bendable tape, a sticky film, or an adhesive plate, having one adhesive side. The connector 2 is configured on the top surface of the film attaching device main body 1, and the film attaching device main body 1 is provided with an up-to-down through window 12 or notch. The connector 2 is connected to the reinforced glass film 3 through the window 12 or notch. Of course, it will be fine as long as part of the reinforced glass film 3 is attached to the connector 2 through the window 12, and the reinforced glass film will not fall out from the recess area 13.

During the production, when the reinforced glass film 3 is loaded in the recess area 13, part of the adhesive area of the connector 2 goes through the window 12 to attach the reinforced glass film 3. At this time, the reinforced glass film 3 is fixed with the film attaching device main body 1.

Figure 9:
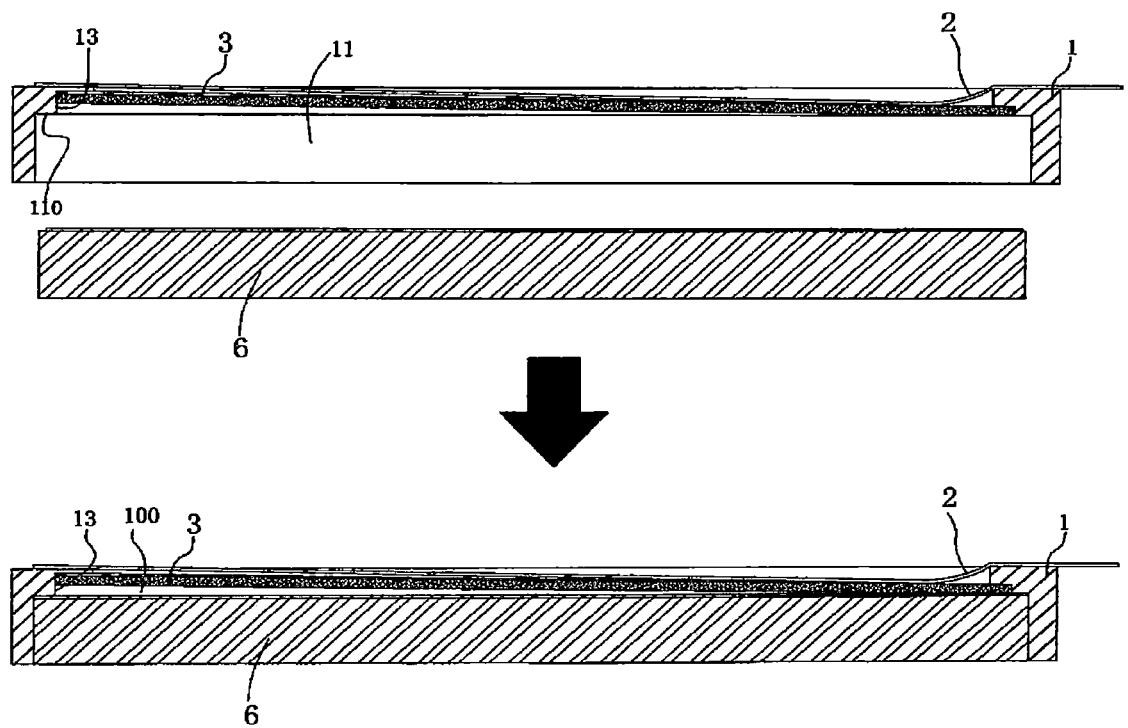
FIG. 9 is a schematic view of Embodiment 3 of the invention during the film attaching process.

FIGS. 8-9 shows the use of this Embodiment 3. Firstly, remove the release film 5 (if attached) on the adhesive side of the reinforced glass film 3. Then, cover the present embodiment of the mobile phone film attaching device equipped with a reinforced glass film on the corresponding model of the mobile phone. See FIG. 9, the reinforced glass film 3 is fixed in the recess area 13 through the connector 2, and of the relative two sides of the reinforced glass film 3, the end on the right side is protruded from or aligned to the bottom surface 110, the end on the left side is not protruded from the bottom surface 110, and there is still a gap 100. Therefore, when the film attaching device main body 1 covers the mobile phone 6, the left end of the reinforced glass film 3 directly touches the screen of the mobile phone 6. At this time, due to the self-adhesion property of the reinforced glass film 3, the reinforced glass film 3 is gradually and automatically attached to the screen from the left to the right, till the automatic adhesion can not continue. Now, remove the connector 2 to separate the reinforced glass film 3 from the connector 2. When the reinforced glass film 3 is not connected to the connector 2, under the tension and self-adhesion force of the material itself, the reinforced glass film 3 is completely attached to the screen of the mobile phone 6. In the end, remove the film attaching device main body 1 to complete the film attaching. Comparing to the previous embodiment, the present embodiment requires removal of the connector 2. At this time, the connector 2 and the reinforced glass film 3 are respectively located on the top surface and bottom surface of the film attaching device main body 1. When removing the connector 2, the reinforced glass film 3 is completely limited between the film attaching device main body 1 and the mobile phone screen. Therefore, even if the connector 2 is removed, it will not affect the position of the reinforced glass film 3. Therefore, in the present Embodiment 3, the connector 2 can be attached to the reinforced glass film 3 using strong adhesives so that, during the whole packaging and transportation processes, the reinforced glass film 3 can be connected to the connector 2 stably, avoiding accidental fall-off.

As the connector 2 acts a function to position the reinforced glass film 3, in order to make sure that the connector 2 is stably attached to the film attaching device main body 1, in the present invention, a positioning mechanism is configured between the connector 2 and the film attaching device main body 1. The positioning mechanism includes: positioning columns 120 configured on the top surface of the film attaching device main body 1 and positioning holes 20 configured on the connector 2. In addition, the two ends of the connector 2 are respectively configured with extended portions 21, and the top surface of the film attaching device main body 1 is configured with a-positioning troughs 121 corresponding to the width of the extended portions 21 of the connector 2. The function of the positioning mechanism is to realize accurate alignment between the connector 2 and the film attaching device main body 1.

Other structures are the same as Embodiment 1 and 2 described above, and are not detailed here.

Embodiment 4

Figure 10:
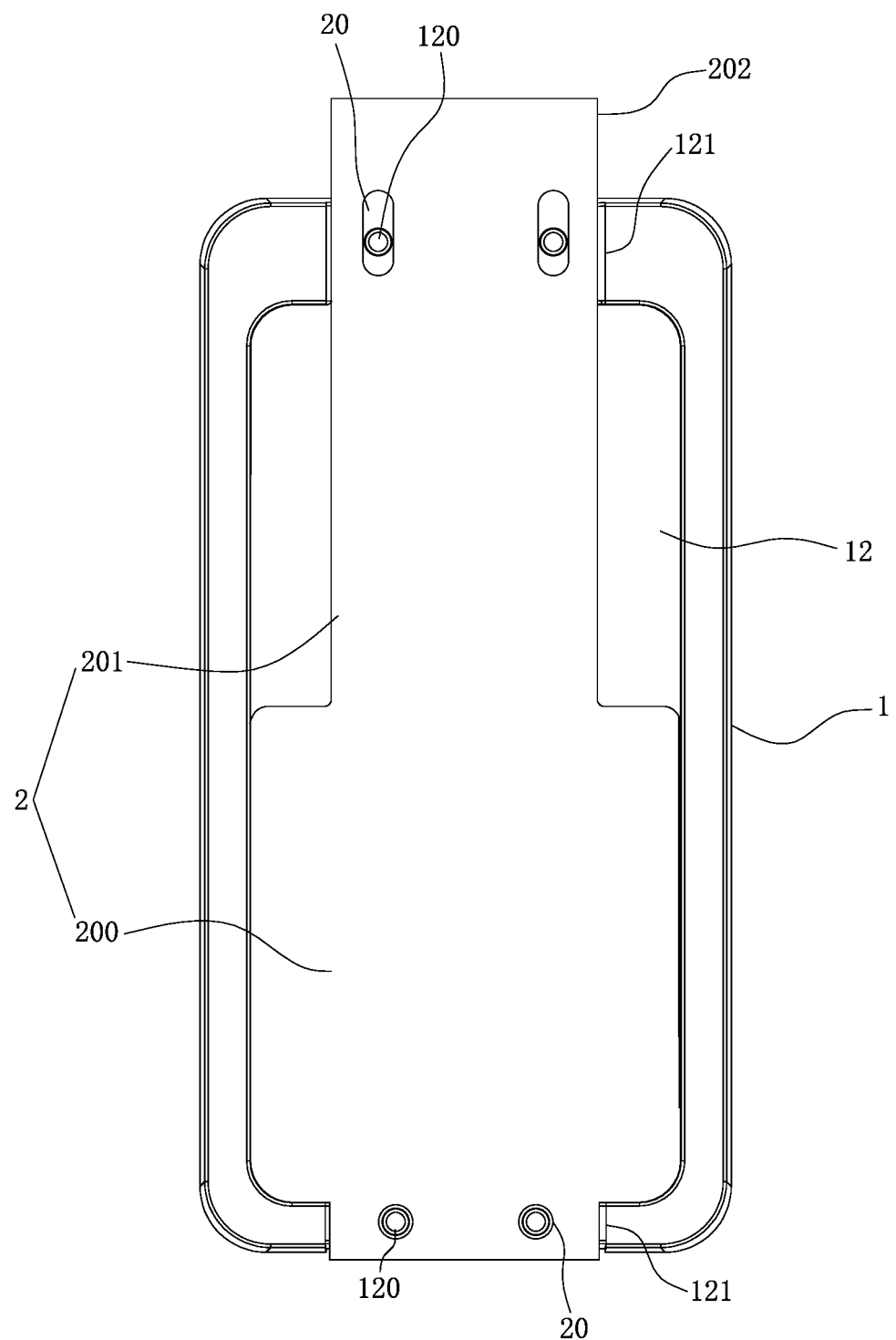
FIG. 10 is a top view of Embodiment 4 of the invention.

Referring to FIG. 10, Embodiment 4 differs from Embodiment 3 in that, the connector 2 of the present\embodiment includes: a main body portion 200 and a narrow portion 201 integrally formed on the top end of the main body portion 200 with its width lower than the width of the main body portion 200. The width of the narrow portion 201 is lower than the width of the window 12 configured on the film attaching device main body 1; the connector 2 also includes a hand-holding portion 202 that is extended out of the film attaching device main body 1, and that has no adhesive side for holding by hand.

Such a design of the connector 2 has the following advantages: when attaching the film, as the size of the narrow portion 201 is relatively small so that there is a gap between the outside of the narrow portion 201 and the window 12. Through this gap, the adhesion process can be clearly seen when the reinforced glass film is attached to the mobile phone screen.

Users can monitor the adhesion process and see if there are any bubbles generated. In addition, the hand-holding portion 202 provides convenience to users. By holding the hand-holding portion 202, the user can easily pull open the connector 2 in relation to the film attaching device main body 1. Thus, work efficiency can be enhanced.

Similarly, in the present embodiment, a positioning mechanism is configured between the connector 2 and the film attaching device main body 1. The positioning mechanism includes: positioning columns 120 configured on the top surface of the film attaching device main body 1 and positioning holes 20 configured on the connector 2. Also, the top surface of the film attaching device main body 1 is configured with a positioning trough 121 with its width matching the corresponding portion of the connector 2.

I claim:

1. A mobile phone film attaching device equipped for attaching reinforced glass film, including:
    a film attaching device main body,
    a connector
    a reinforced glass film,
    a holding space formed by the film attaching device main body for matching the shape of a mobile phone and covering the mobile phone,
        wherein the holding space has a bottom surface for abutting against a bottom surface of the mobile phone; and
    a recessed area formed in the holding space away from the mobile phone open;
    wherein
        the reinforced glass film is arranged in the recessed area and adhered through the connector, and
        wherein one end surface of the reinforced glass film protrudes above the bottom surface towards the mobile phone opening or is flush with the bottom surface, and the opposing end surface is recessed below the bottom surface away from the mobile phone opening;
        wherein when the film attaching device main body is covering the mobile phone, the one end surface of the reinforced glass film that protrudes above or is flush with the bottom surface is in contact with the mobile phone screen, and the opposing surface of the reinforced glass film that is recessed below the bottom surface such that a gap is disposed between the bottom surface and the mobile phone screen.

2. The mobile phone film attaching device equipped with a reinforced glass film defined in claim 1,
    wherein the depth of the recess area has height differences, the depth on one side is larger than the depth on the other side, through the height difference, the reinforced glass film is in a tilted position in relation to the bottom surface.

3. The mobile phone film attaching device equipped with a reinforced glass film defined in claim 1,
    wherein a raised portion is configured between the recess area and the reinforced glass film, through the raised portion, the reinforced glass film is in a tilted position in relation to the bottom surface.

4. The mobile phone film attaching device equipped with a reinforced glass film defined in claim 1,
    wherein the loading bottom surface of the recess area to load the reinforced glass film is tilted, i.e., the depth of the recess area varies gradually from one end of the film attaching device main body to the other end, through the loading bottom surface, the reinforced glass film is at a tilted position in relation to the bottom surface.

5. The mobile phone film attaching device equipped with a reinforced glass film defined in claim 1,
    wherein the holding space is enclosed by continuous or discontinuous edgings.

6. The mobile phone film attaching device equipped with a reinforced glass film defined in claim 1,
    wherein the connector is connected to the upper surface of the reinforced glass film, the lower surface of the reinforced glass film is attached with a release film.

7. The mobile phone film attaching device equipped with a reinforced glass film defined in claim 6,
    wherein the release film has an extended portion extending out of the reinforced glass film area.

8. The mobile phone film attaching device equipped with a reinforced glass film defined in claim 6,
    wherein the connector is an adhesive layer or an adhesive piece, the connector is fixed on the bottom surface of the film attaching device main body, and the reinforced glass film is suspended and adhered to the recess area through the connector.

9. The mobile phone film attaching device equipped with a reinforced glass film defined in claim 6,
    wherein the connector is a tape, sticker or film with one single adhesive surface, the connector is configured on the upper surface of the film attaching device main body, and the film attaching device main body is provided with an up-to-down through window or notch, the connector is connected to the upper surface of the reinforced glass film through the window or notch.

10. The mobile phone film attaching device equipped with a reinforced glass film defined in claim 9,
    wherein a positioning mechanism is formed on the upper surface of the film attaching device main body to match the connector.

11. The mobile phone film attaching device equipped with a reinforced glass film defined in claim 9,
    wherein the connector includes a main body portion and an extended portion integrally connected to the upper end of the main body portion with its width smaller than that of the main body portion, the width of the extended portion is smaller than that of the window; the connector also includes a hand-holding portion that is protruding out of the end of the film attaching device main body, and that has no adhesive side for holding by hand.

* * * * *